(12) United States Patent
Ohara

(10) Patent No.: US 6,467,591 B2
(45) Date of Patent: Oct. 22, 2002

(54) LINING MEMBER FOR USE IN FISHING REEL AND METHOD FOR MANUFACTURING

(75) Inventor: Takeshige Ohara, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/804,394

(22) Filed: Mar. 13, 2001

(65) Prior Publication Data

US 2001/0020661 A1 Sep. 13, 2001

(30) Foreign Application Priority Data

Mar. 13, 2000 (JP) ........................................ 2000-069078

(51) Int. Cl.$^7$ .............................................. E16D 69/00
(52) U.S. Cl. .................. 188/251 A; 188/83; 188/264 B
(58) Field of Search .................. 188/264 B, 251 A, 188/83, 130; 464/8, 10, 903; 384/370, 909, 911; 242/84.5 A, 84.5 R, 84.51 A, 84.51 R, 84.5 P

(56) References Cited

U.S. PATENT DOCUMENTS 3,889,937 A * 6/1975 Statler ........................ 267/202
4,664,330 A * 5/1987 Darden ................... 188/251 A
5,246,521 A * 9/1993 Shimura et al. ............. 156/251

FOREIGN PATENT DOCUMENTS

JP 4-27338 6/1992

* cited by examiner

Primary Examiner—Matthew C. Graham
Assistant Examiner—C. T. Bartz
(74) Attorney, Agent, or Firm—Sughrue Mion, PLLC

(57) ABSTRACT

A lining member is provided for a drag mechanism of a fishing reel. The lining member includes fibers (43) which are adhered to a base member (41) by an adhesive layer so that each fiber extends in a direction substantially perpendicular to the surface of the base member (41), wherein one end of each fiber is adhered to the adhesive layer, and other end of each fiber is free from the adhesive layer.

9 Claims, 10 Drawing Sheets

LINING MEMBER FOR USE IN FISHING REEL AND METHOD FOR MANUFACTURING

BACKGROUND OF THE INVENTION

1. Field of the Invention

The present invention relates to a lining member for use in a drag mechanism incorporated into various fishing reels such as a spinning reel and a double-bearing type reel.

2. Related Art

Generally, in the fishing reels, there is incorporated a drag mechanism which, in case where a fish is caught, allows a spool with a fishing line wound thereon to rotate in a fishing line play-out direction with a given brake force (drag force).

This drag mechanism includes a lining member which can be pressed by a pressure member and, due to a frictional force caused by the pressure of the pressure member, can apply a given brake force to the spool.

Normally, as the lining member of this type, there is widely known a lining member using wool felt fibers which are randomly intertwined together; and, grease is applied to such lining member before it is actually used.

However, in a fishing reel incorporating therein a drag mechanism including the lining member formed of wool felt, there arise the following problems.

That is, the above-mentioned wool felt can be deformed greatly when it is compressed and, when it is once compressed with high pressure, the wool felt cannot be restored to its original thickness; that is, the wool felt is easy to wear and is poor in durability. Therefore, in the case of the lining member formed of wool felt, it is necessary to replace its felt portion frequently. Also, when a big fish is caught, in case where a fishing line is played out at a high speed and a great frictional force is thereby given, the lining member is carbonized and the drag durability of the lining member is thereby greatly reduced. Further, in the case of normal wool felt, since the fibers thereof are randomly intertwined together, the grease is not distributed uniformly over the entire surface of the lining member; and, therefore, in case where the lining member is compressed, spaces between the fibers thereof are crushed so that the lining member is not be able to hold the grease properly. As a result of this, in case where the fishing reel including such lining member is used for a long period of time, the oil film of the friction surface of the lining member is torn, which makes it impossible to obtain a smooth drag force or causes seizure to occur in the friction surface of the lining member.

In order to improve the above drawbacks, in Japanese Examined Utility Model Publication Hei.4-27338, there is disclosed a lining member composed of a heat-resistant and flexible base plate and a heat-resistant woven cloth bonded to the base plate.

In this lining member, however, since the elastic force thereof in the pressure contact direction thereof is low, the drag adjusting width of the lining member is small (that is, the adjustment of the drag force of the lining member is severe). As a result of this, the rising of the brake force (drag force) occurs suddenly, which makes it difficult to apply the lining member to a fishing reel using a fine fishing line. Also, because the lining member is of a dry type which does not use grease, the durability of the lining member can be lowered in case where water or oil flows into the lining member, or slips (stick slips) can occur intermittently: that is, the lining member is not be able to provide stable drag performance.

SUMMARY OF THE INVENTION

The present invention aims at eliminating the drawbacks found in the above-mentioned conventional lining members. Accordingly, it is an object of the invention to provide a lining member for use in a fishing reel which is improved in elasticity and durability to thereby be able to prevent the drag durability and drag performance thereof from being lowered even in case where it is used for a long period of time.

Also, it is another object of the invention to provide a method or manufacturing the above-structured lining member easily.

In attaining the above object, according to a first aspect of the invention, there is provided a lining member of a fishing reel including, a reel main body, a spool rotatably supported to the reel main body, a handle rotatably supported to the reel main body for winding a fishing line onto the spool, and a drag mechanism incorporated in the reel main body, the drag mechanism comprising:

the lining member for applying a brake force to a rotational movement of the spool in a fish line play-out direction, the lining member including,
a base member,
an adhesive layer applied to a surface of the base member, and
fibers, wherein one end of each fiber is adhered to the adhesive layer, the other end of each fiber is free of the adhesive layer.

According to a third aspect of the invention, in the lining member of the first aspect, each fiber has heat-resistant, which length is from 0.5 to 5 mm.

According to a fourth aspect of the invention, in the lining of the first aspect, grease is spread uniformly over a surface of the lining member.

According to a fifth aspect of the invention, in the lining of the first aspect, lubricating particles each having a diameter of 0.001–1 mm is mixed among the fibers.

According to a sixth aspect of the invention, in the lining member of the first aspect, the drag mechanism includes a pressure member generating the brake force in cooperation with the lining member.

According to a seventh aspect of the invention, in the lining member of the first aspect, the fibers extend in a direction substantially perpendicular to the surface of the base portion.

According to a eighth aspect of the invention, there is provided a method of manufacturing a lining member used in a drag mechanism incorporated in a fishing reel, said method comprising the steps of:

electrically charging a roller;
attracting fiber chips to an outer peripheral surface of the roller; and rolling the roller with respect to a base member with an adhesive applied to a surface thereof to transfer the attracted fiber chips to the base member.

According to a ninth aspect of the invention, in the method of manufacturing the lining member of the eighth aspect, in the attracting step, the fiber chips is so attracted to the outer peripheral surface of the roller that respective fibers of the fiber chips stand side by side on the outer peripheral surface of the roller.

According to a tenth aspect of the invention, in the method of manufacturing the lining member of the eighth aspect, in said attracting step, the roller is approached to the fiber chip while rotating the roller.

According to a eleventh aspect of the invention, there is provided a lining member of a fishing reel including, a reel main body, a spool rotatably supported to the reel main body, a handle rotatably supported to the reel main body for winding a fishing line onto the spool, and a drag mechanism incorporated in the reel main body, the drag mechanism comprising:

the lining member for applying a brake force to a rotational movement of the spool in a fish line play-out direction, the lining member including,
a base member, and
fibers provided on a surface of the base portion, which length is from 0.5 to 5 mm.

According to a twelfth aspect of the invention, in the lining member of the eleventh aspect, the fibers are oriented in a direction substantially perpendicular to the surface of the base portion.

BRIEF DESCRIPTION OF THE DRAWINGS

FIG. 10(a) is a graphical representation of the measured results before the state of the reel was changed with age, while FIG. 10(b) is a graphical representation of the measured results after the state of the reel was changed with age;

FIG. 11(a) is a graphical representation of the measured results before the state of the reel was changed with age, while FIG. 11(b) is a graphical representation of the measured results after the state of the reel was changed with age;

DESCRIPTION OF THE PREFERRED EMBODIMENTS

Now, description will be given below of an embodiment of a lining member according to the invention with reference to the drawings. Firstly, description will be given below of an example of the structure of a fishing reel (a double-bearing type reel) using a lining member according to the invention.

Figure 1:
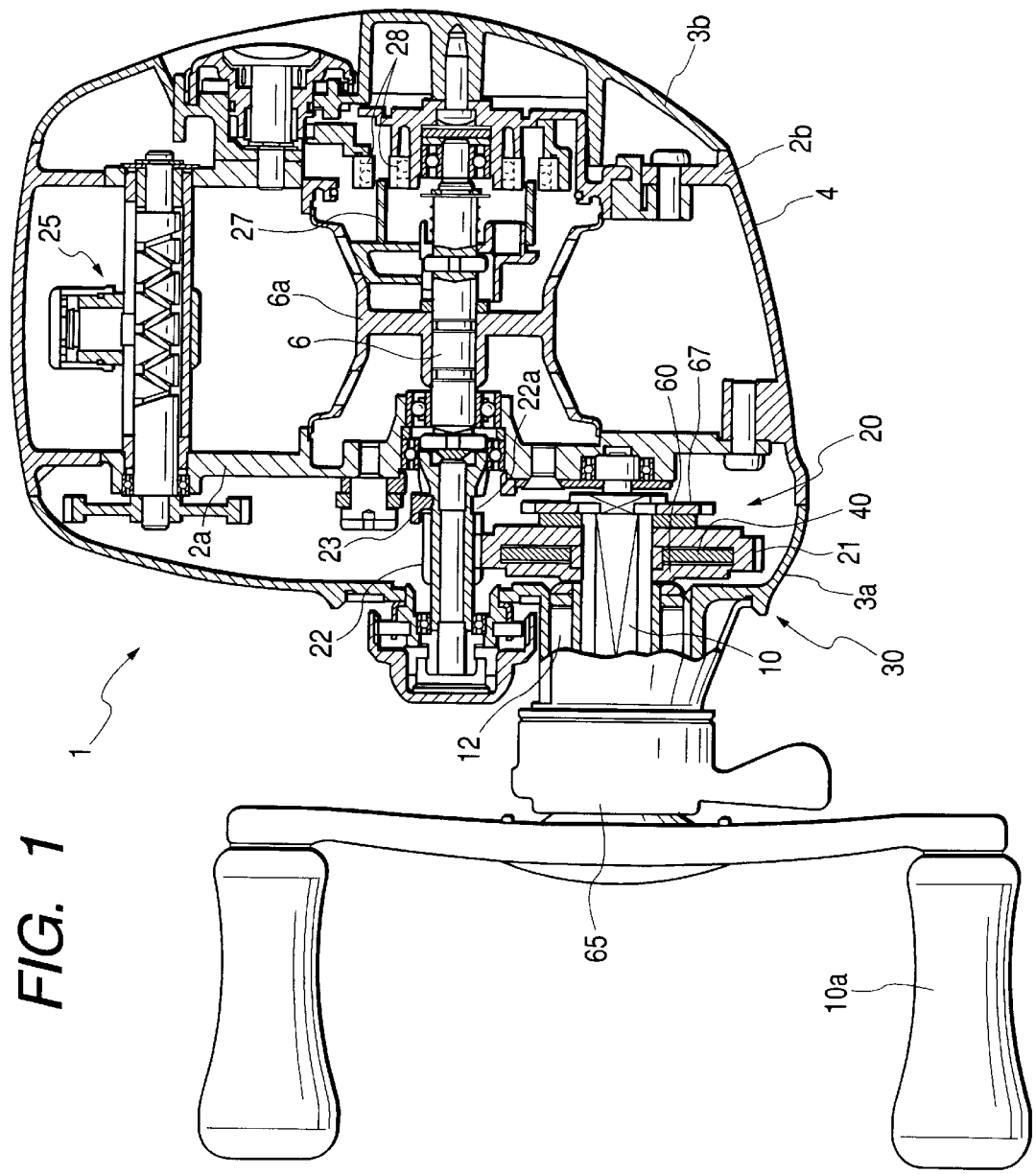
FIG. 1 is a view of the whole structure of a fishing reel (double-bearing type reel) using a lining member according to the invention.

As shown in FIG. 1, a double-bearing type fishing reel 1 comprises a reel main body 4 including left and right side plates 3a and 3b respectively mounted on their associated left and right frames 2a and 2b. A spool shaft 6 is supported between the left and right frames 2a and 2b (left and right side plates 3a and 3b) in such a manner that it can be rotated through a bearing. A spool 6a around which a fishing line can be wound is mounted on the spool shaft 6.

The spool 6a can be rotated by rotating a handle 10a mounted on the end portion of a handle shaft 10 provided on and projected from the left side plate 3a. The handle shaft 10 is supported between the left frame 2a and left side plate 3a in such a manner that it can be rotated through a bearing, and the handle shaft 10 can be rotated only in a fishing line take-up direction by a one-way clutch 12.

A drive force transmission mechanism 20 which transmits the rotational movement of the handle 10a to the spool shaft 6 is interposed between the left frame 2a and left side plate 3a. The drive force transmission mechanism 20 comprises a drive gear 21 so mounted as to be rotatable with respect to the handle shaft 10, and a pinion 22 is engageable with the drive gear 21 and is rotatably supported between the left frame 2a and left side plate 3a through a bearing.

A circumferential groove 22a is formed at the outer periphery of the pinion 22. A clutch plate 23 movable in the axial direction by a clutch operation member (not shown) is engaged with the circumferential groove 22a. In this case, by operating the clutch operation member to move the pinion 22 in the axial direction, the drive force transmission mechanism 20 can be switched over to such a drive force transmission state (clutch-on state) as shown in FIG. 1, or to a spool-free rotational state (clutch-off state) in which the pinion 22 is disengaged from the spool shaft 6. The return of the drive force transmission mechanism 20 from the clutch-off state to the clutch-on state can also be achieved by performing the take-up operation of the handle 10a, besides by performing the above-mentioned operation of the clutch operation member.

A known level wind device 25 is interposed between the left and right frames 2a and 2b. Therefore, by rotating the handle 10a, a fishing line can be wound uniformly onto the spool 6a through a fishing line guide portion.

Also, on one end side of the spool shaft 6, there is disposed a backlash preventive mechanism which includes an annular-shaped conductor 27 to be rotatable integrally with the spool 6, and a magnet 28 which, when the annular-shaped conductor 27 is inserted, applies a magnetic force to the conductor 27 to thereby brake the rotation of the spool 6a; that is, in case where the spool 6a is rotated excessively, the twisting of the fishing line can be prevented by the backlash preventive mechanism.

A drag mechanism 30 which, when the fishing line is played out from the spool 6a in fishing, applies a drag force to the spool 6a is engaged with the drive gear 21. The drag mechanism 30 according to the present embodiment includes a lining member 40 stored in a recessed portion formed in the drive gear 21 and a pressure member 60 for applying pressure to the lining member 40. The pressure member 60 can be moved to the lining member 40 side by rotating a drag operation member 65 mounted on the handle shaft 10, so that the pressure member 60 can be pressed against the lining member 40 to thereby apply a given level of pressure to the drive gear 21. And, the pressure acts on a ratchet 67 which can be rotated integrally with the handle shaft 10, with the result that there is generated a given drag force between the handle shaft 10 and drive gear 21.

Therefore, in case where the tightening force of the drag operation member 65 is held in a loosened state, when the spool 6a is rotated in the fishing line play-out direction due to catch of a fish, the drive gear 21 is caused to slide with respect to the handle shaft 10 due to the action of a frictional force caused by the lining member 40, so that the spool 6a is rotated with a brake force applied thereto. As a result of this, even in case where a sudden load is given to the fishing line, the fishing line can be prevented from being cut.

Next, description will be given below of the structure of the lining member 40 employed in the above drag mechanism 30.

Figure 2:
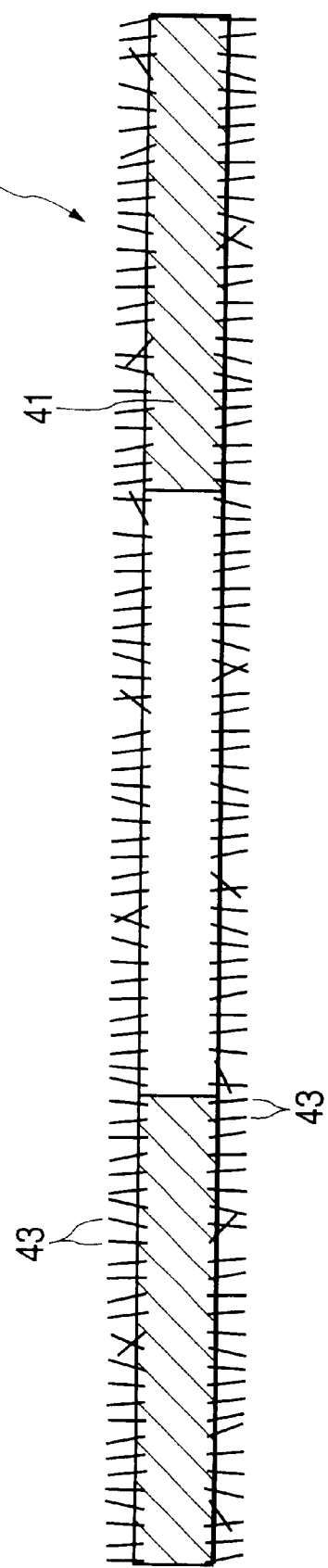
FIG. 2 is a section view of the lining member used in a drag mechanism of the fishing reel shown in FIG. 1.
Figure 3:
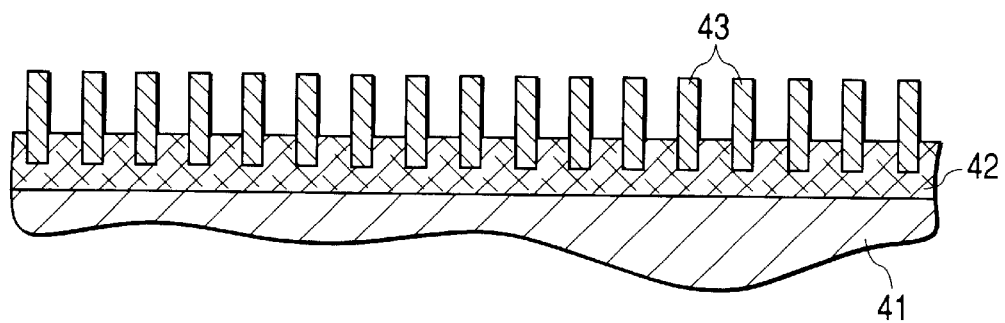
FIG. 3 is an enlarged typical view of the lining member shown in FIG. 2.
Figure 4:
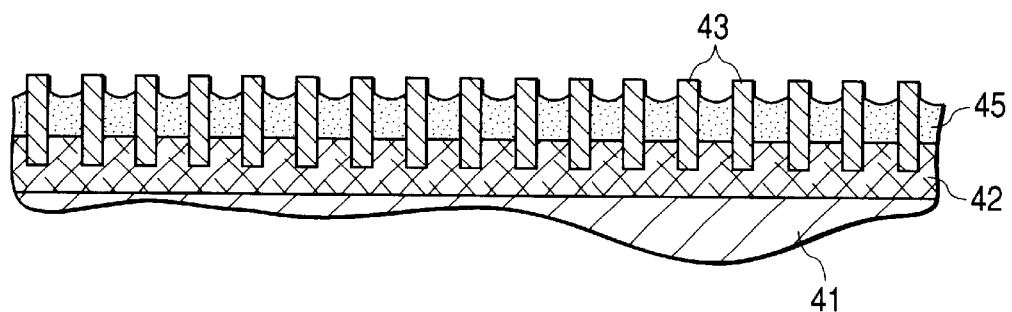
FIG. 4 is a view of the lining member shown in FIG. 3, showing a state thereof in which grease is held on the surface of the lining member.

Here, FIG. 2 is a section view of the lining member, FIG. 3 is an enlarged typical view of the lining member shown in FIG. 2, and FIG. 4 is a view of the lining member, showing a state thereof in which grease is held on the surface of the lining member.

The lining member 40 is structured as follows. An adhesive 42 formed of epoxy resin or phenol resin to thereby form an adhesive layer is applied onto a surface of a plate-shaped base member 41. The plate-shaped base member 41 is formed of the material that is difficult to be carbonized and is heat-resistant. A large number of fibers 43, which is heat-resistant fibers each of which is formed as a short fiber of the order of 0.5–5 mn, are disposed on the adhesive layer so as to respectively orient in a direction substantially perpendicular to the surface of the base member 41. In this case, the plate-shaped base member 41 can be formed by arranging, for example, aramide fibers in a woven cloth shape. However, the plate-shaped base member 41 is not limited to such woven cloth but, for example, the base member 41 can also be formed of paper, felt, carbon, or FRP (Fiber Reinforced Plastics). As the material for forming the fibers 43, preferably, there may be used the material that is difficult to be carbonized and is heat-resistant; for example, aramide, carbon, glass, nylon, or polyester can be used. By the way, the fibers 43 may be raised as a whole, that is, the fibers 43 may be projected upwardly; for example, as shown in FIG. 2, the fibers 43 may be fallen in part, or they may be inclined in part.

Since the fibers 43 are disposed on the base member 41 in such a manner that they are oriented in the direction substantially perpendicular to the surface of the base member 41, in case where grease 45 is applied to the lining member 40, as shown in FIG. 4, the grease 45 can be spread uniformly over the whole surface of the lining member 40 and also the grease 45 can be held between the fibers 43, so that oil films can always be formed on the friction surface of the lining member 40 and thus a stable drag force can be obtained. Also, because the fibers 43 are worn away uniformly on and from the leading end sides thereof, that is, they are carbonized on and from the leading end sides thereof, partial oil film breakage as well as seizure can be prevented, which in turn makes it possible to prevent the durability of the drag mechanism from being lowered.

Further, because the fibers 43 are disposed on the base member 41 in such a manner that they is oriented substantially in the direction substantially perpendicular to the surface of the base member 41 as a whole, they are elastic in the vertical direction thereof and thus, even in case where they are pressed by their mating member such as the pressure member, the fibers 43 are easy to return to their original states (their original thickness). That is, the lining member is little deformed when it is compressed and can be restored to its original thickness even in case where it is compressed. This not only eliminates the need for frequent replacement of the lining member but also can provide a stable drag action of a wide adjusting width for a long period of time. And, due to the wide drag adjusting width, the rising of the brake force can be made gentle, which makes it possible for the lining member to be applied effectively to a fishing reel using a fine fishing line.

In the above-mentioned structure, preferably, lubricating particles each having a diameter of the order of 0.001–1 mm (for example, lubricating particles formed of graphite) may be mixed among the fibers 43. Mixture of such lubricating particles not only can smooth the starting action of the drag force but also can further reduce the wear of the fibers 43 to thereby enhance the durability of the fibers 43.

Also, preferably, a wear-resistant treatment may be enforced on the pressure member to be contacted with the above-structured lining member as well as on the mating member of the drive gear, so that the surfaces thereof can be made hard to be worn and the smooth drag operation cannot be impaired.

Specifically, to realize the structure whose surface is hard to be worn away (the structure whose wear-resistance can be enhanced), the surface hardness of the lining member may be enhanced or the material itself of the lining member may be changed. In this case, the enhancement in the surface hardness can also be achieved by enforcing a plating treatment (wet-type, dry-type, melting, fusion spraying) on the surface of a base material (SUS, Al, or resin) which is easy to mold; and, in the case of SUS, a nitriding treatment may be enforced to thereby be able to enhance the surface hardness of the lining member and, in the case of Al, a hard alumite treatment may be enforced to thereby be able to enhance the surface hardness. Also, in the case of metal such as SUS, or Al, a heat treatment may be enforced to thereby be able to enhance the surface hardness further.

Specifically, in the case of the wet plating treatment, a plating layer can be formed by electric plating (copper, nickel, chromium, gold), or by chemical plating (electroless nickel phosphorus (Ni—P), electroless copper); and, in the case of the dry plating treatment, a plating layer can be formed by a PVD method (vacuum deposition, spattering, ion plating), or by a CVD method (heat, plasma, light).

Especially, the plating layers formed according to the wet plating treatments are greater in thickness than the plating layers formed according to the other plating treatments and thus they are higher in the surface hardness; and, among them, in the case of the electroless nickel phosphorus (Ni—P) plating method, by mixing Teflon (PTFE), silicon carbide (SiC), and boron nitride (BN) into the electroless nickel phosphorus, not only the wear resistance of the plating layer can be enhanced but also generation of stick slips can be prevented, so that the drag performance of the lining member can be enhanced further.

Referring to the change of the material of the mating member of the lining member, for example, there may be used ceramics (SiC, $Al_2O_3$, $Si_3N_4$) or Diamond Like Carbon (DLC)

That is, in case where the materials of the members to be contacted with the lining member according to the invention are changed properly in the above-mentioned manner, not only the performance of the lining member can be maintained for a long period of time but also the durability of the drag mechanism can be enhanced.

Especially, in case where the electroless nickel phosphorus (Ni—P) plating treatment with Teflon (PTFE) mixed therein is enforced on the surface of the mating member, not only the surface hardness and wear resistance of the mating member can be enhanced remarkably over those of the mating members produced according to the conventional plating treatments but also generation of stick slips can be reduced greatly. As a result of this, the thus-plating-treated member provides the mating member the chemistry of which is best suited for the lining member according to the invention.

Next, description will be given below of an example of a method of manufacturing the above-mentioned lining member.

Figure 5:
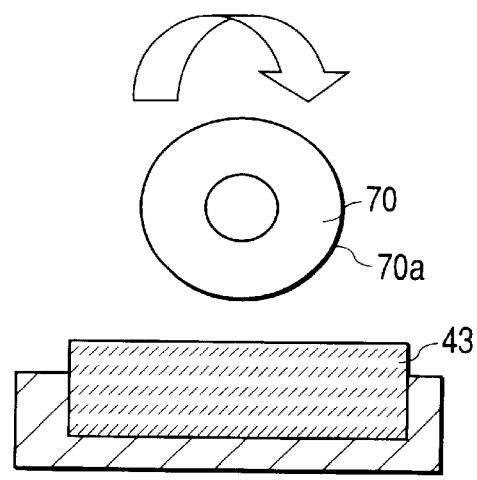
FIG. 5 is a view of a process for manufacturing a lining member, showing a roller before it is electrically charged.
Figure 6:
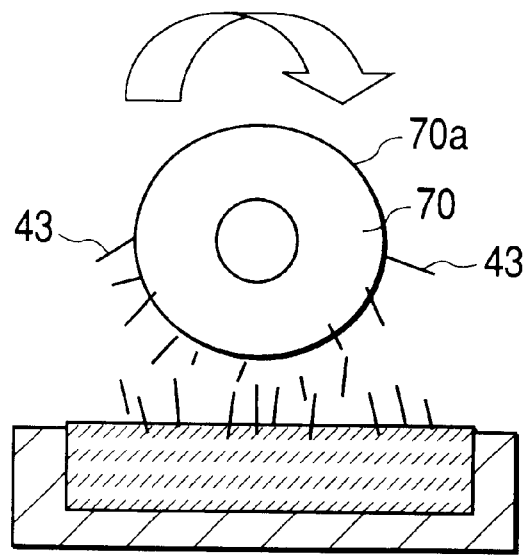
FIG. 6 is a view of a process to be executed after the process shown in FIG. 5, showing the roller after it is charged.
Figure 7:
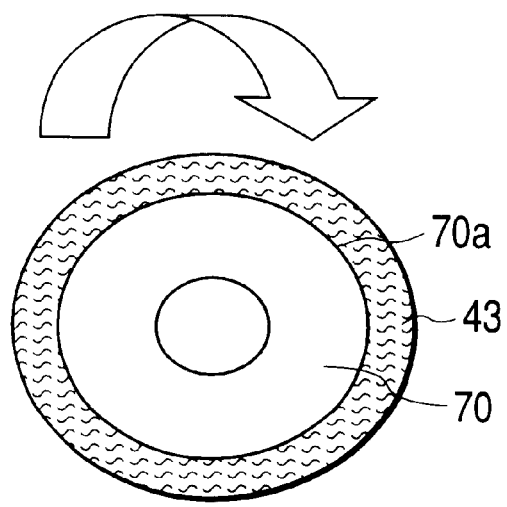
FIG. 7 is a view of a process to be executed after the process shown in FIG. 6, showing a state in which short fibers are attracted to the charged roller.
Figure 8:
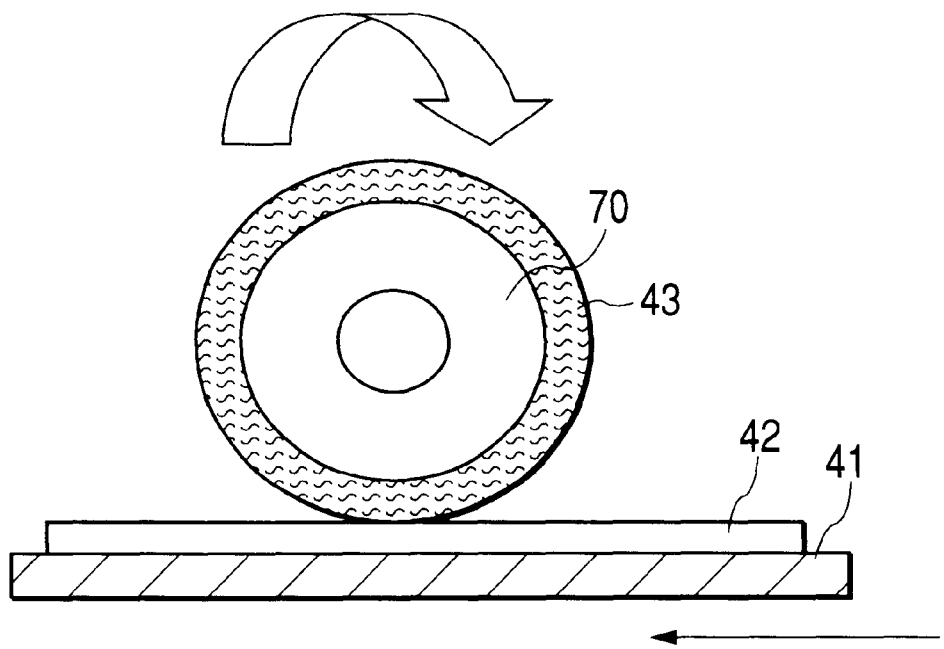
FIG. 8 is a view of a process to be executed after the process shown in FIG. 7, showing a state in which the short fibers are transferred to a base member.
Figure 9:
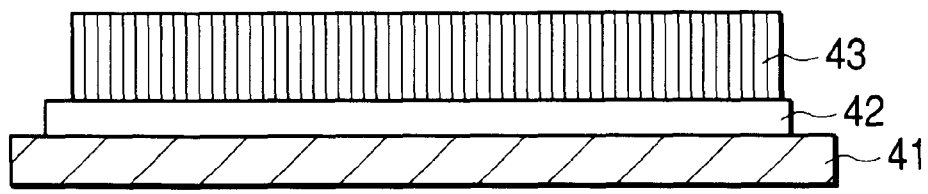
FIG. 9 is a typical view of the lining member to be manufactured after the process shown in FIG. 8.

As shown in FIGS. 5 to 7, a large number of the above-structured short fibers 43 (fiber chips) are collected together and an electrically charged roller 70 is made to approach the collected short fibers 43 while rotating the roller 70, therefore, the short fibers 43 are attracted to the entire outer peripheral surface 70a of the roller 70. In this case, the respective short fibers are held in such a manner that they stand side by side on the outer peripheral surface 70a of the roller 70. And, as shown in FIG. 8, the roller 70 is rolled with respect to the base member 41 with the adhesive 42 applied to the surface of the base member 41, thereby transferring the attached short fibers 43 to the base member 41. Due to this, as typically shown in FIG. 9, there can be easily manufactured a lining member in which a large number of short fibers 43 are disposed on the surface of the base member 41 through the adhesive (adhesive layer) 42 in such a manner that the short fibers 43 is oriented in a direction substantially perpendicular to the surface of the base member 41.

Now, on a fishing reel incorporating therein a drag mechanism which includes the above-structured lining member, the inventors have conducted a test as to how the drag performance thereof changes with age.

The test was done in the following manner: that is, a double-bearing type reel incorporating therein a drag mechanism including the above-structured lining member according to the invention and a double-bearing type reel incorporating therein a drag mechanism including a conventional lining member formed of wool felt (the other remaining portions than the lining member are entirely the same in structure) are prepared. And these two reels were putted in condition similar to deterioration due to change with age are given to the respective reels. Stick slips of these reels were measured. In this case, the measurement of the stick slips was carried out together with the measurement of changes with age in tensile forces which acted on a fishing line when the fishing line was played out with a load of 3.0 kg. Also, the changes with age were measured by placing the two double-bearing type reels in the high temperature and high humidity atmosphere at four cycles a day, a total of 20 cycles. for deterioration.

Figure 10A:
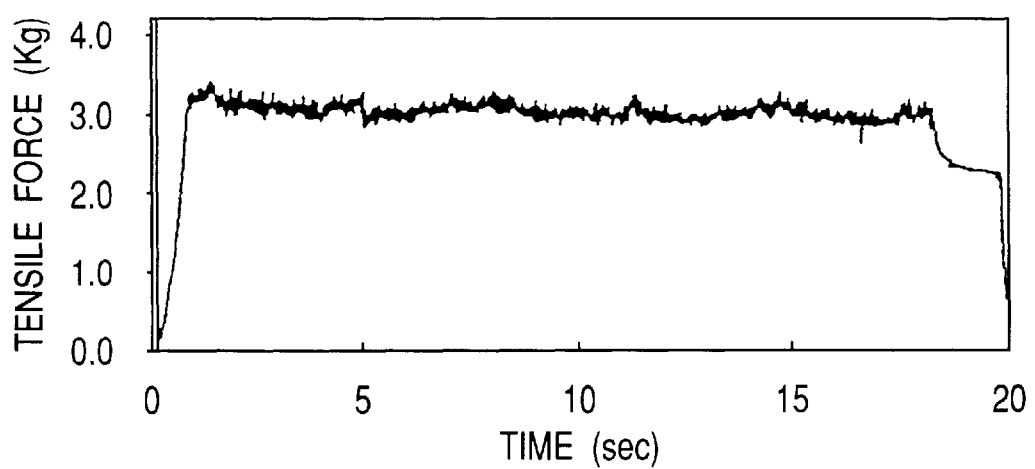
FIGS. 10(a) and 10(b) are respectively graphical representations of the measured results of stick slips occurring in a double-bearing type reel using a lining member according to the invention; and, specifically.
Figure 10B:
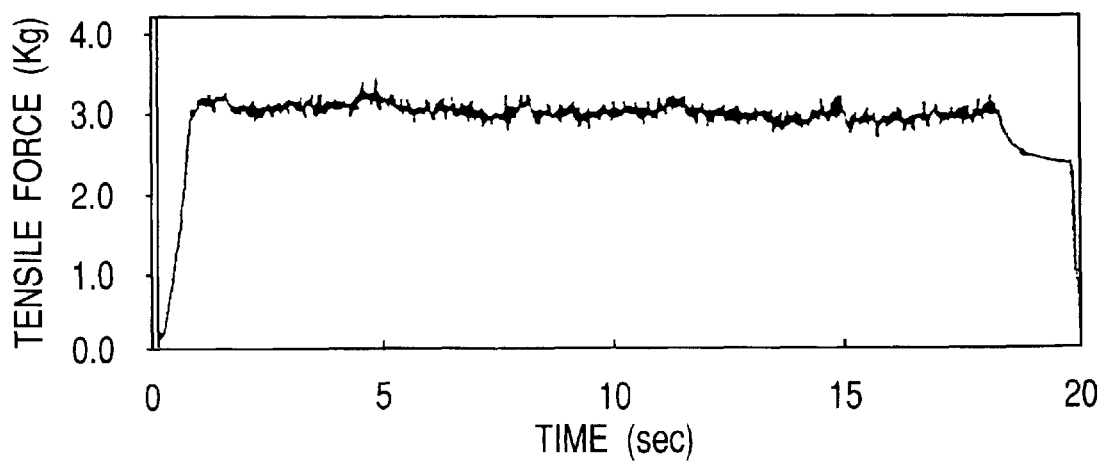
Figure 11A:
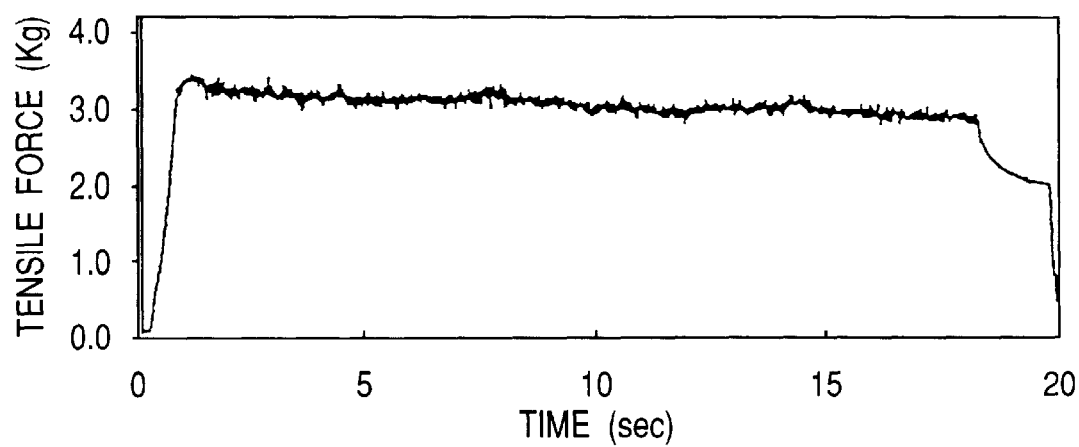
FIGS. 11(a) and 11(b) are respectively graphical representations of the measured results of stick slips occurring in a double-bearing type reel using a conventional lining member; and, specifically.
Figure 11B:
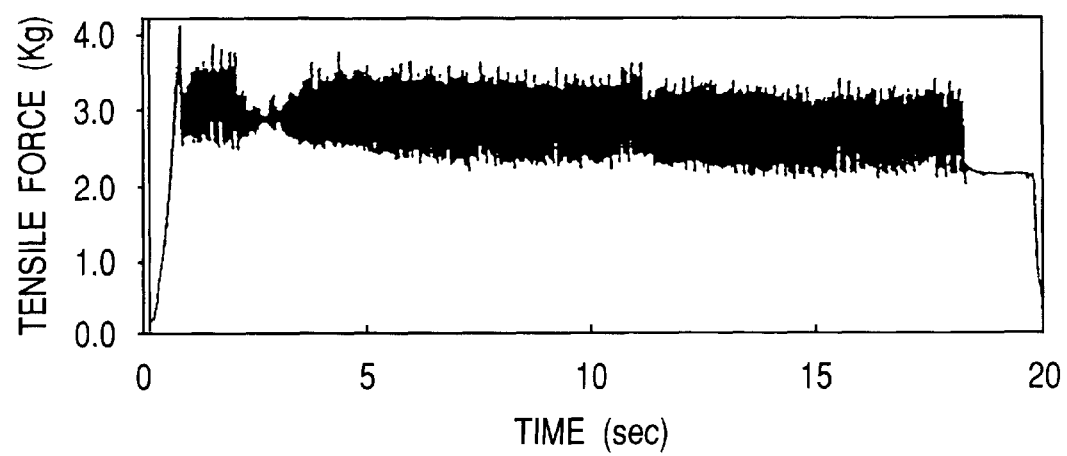

FIG. 10(a) is a graphical representation of the measured results before the changes with age of the double-bearing type reel according to the invention. FIG. 10(b) is a graphical representation of the measured results after the changes with age thereof. FIGS. 11(a) and 11(b) are respectively graphical representation of the measured results before and after the changes with age of the conventional double-bearing type reel.

As can be clearly understood from the above measured results, in the case of the double-bearing type reels according to the invention, even after the state of the reel was changed with age, the stick slip did not become large. But, on the other hand, in the case of the conventional double-bearing type reel, the stick slip became large after the state of the reel was changed with age. That is, according to the double-bearing type reel incorporating therein a drag mechanism including the above-structured lining member, not only a stable drag action can be obtained for a long period of time, but also, even in case where a relatively fine fishing line is wound around the spool, the fishing line can be prevented from being cut to thereby be able to obtain a stable drag action.

Also, for a double-bearing type reel according to the invention and a conventional double-bearing type reel, the inventors have conducted another test on the reduction of the tensile forces of fishing lines respectively wound around the spools of the inventive and conventional reels (the tensile forces were measured under the conditions that the load was 3.0 Kg, the play-out speed was 15 km/m and the play-out distance was 50 m). According to this test, in the case of the double-bearing type reel according to the invention, the average reduction of the tensile force was 11%; whereas, in the case of the conventional double-bearing type reel, the average reduction of the tensile force was 35%. That is, according to the double-bearing type reel incorporating therein a drag mechanism including the above-structured lining member, even in case where the fishing line is played out long, a relatively stable drag force can be provided.

Also, in the above-mentioned structure, preferably, there may be formed an uneven portion on the surface of the lining member 40. That is, formation of such uneven portion can provide a drag mechanism which is able to enhance the holding force of the grease, to prevent the oil film of the frictional surface from being cut even when the lining member 40 is used long, and to prevent occurrence of seizure effectively.

Specifically, the uneven portion to be formed on the surface of the lining member can be formed in various shapes, for example, in such shapes as shown in FIGS. 12 to 16.

Figure 12:
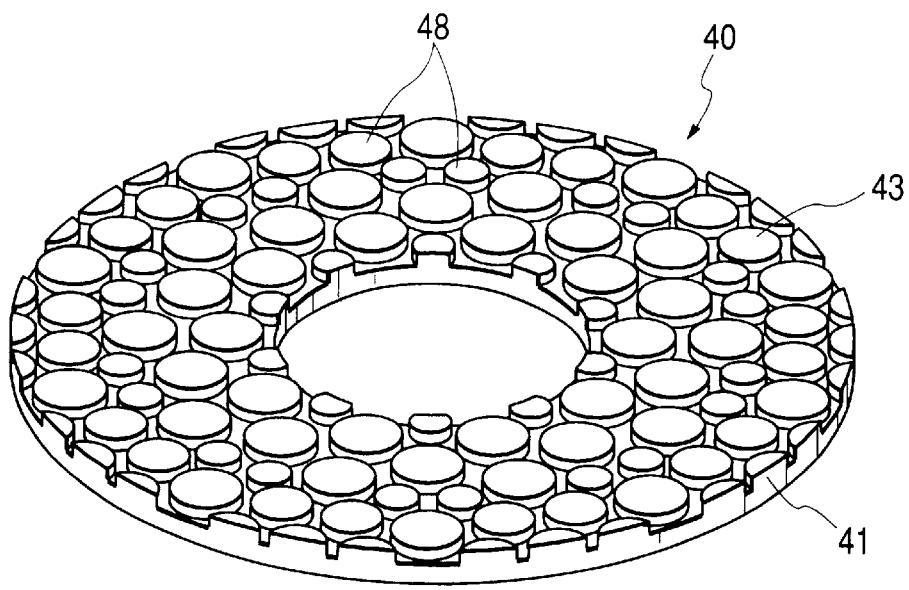
FIG. 12 is a view of an example of the structure of an uneven portion to be formed on the surface of a lining member.
Figure 13:
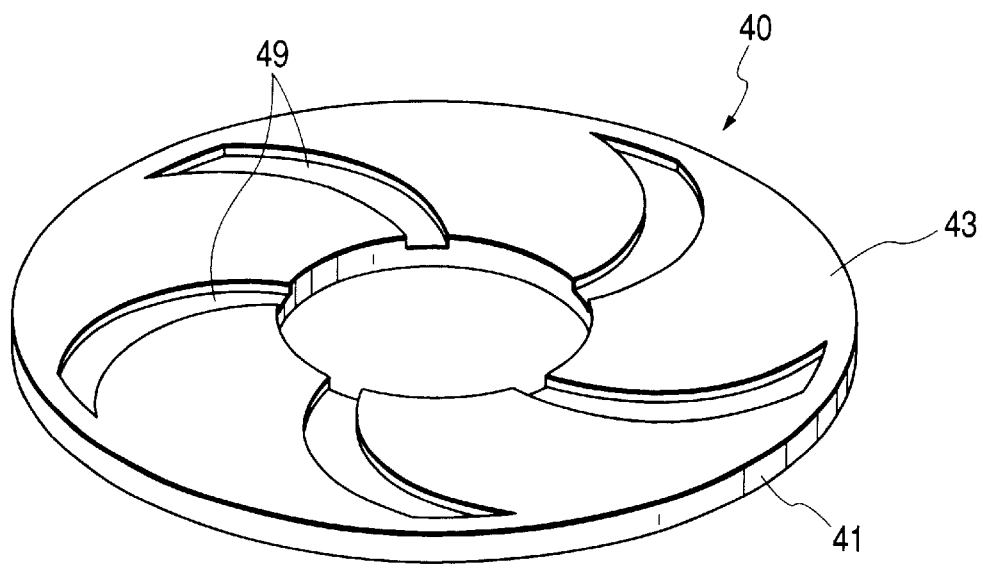
FIG. 13 is a view of a first modification of the structure of an uneven portion to be formed on the surface of a lining member.
Figure 14:
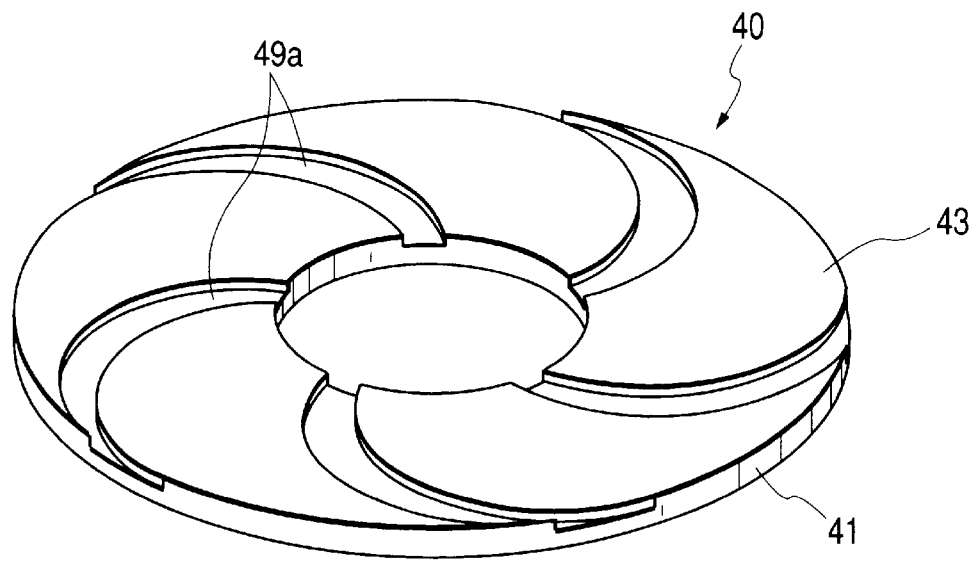
FIG. 14 is a view of a second modification of the structure of an uneven portion to be formed on the surface of a lining member.
Figure 15:
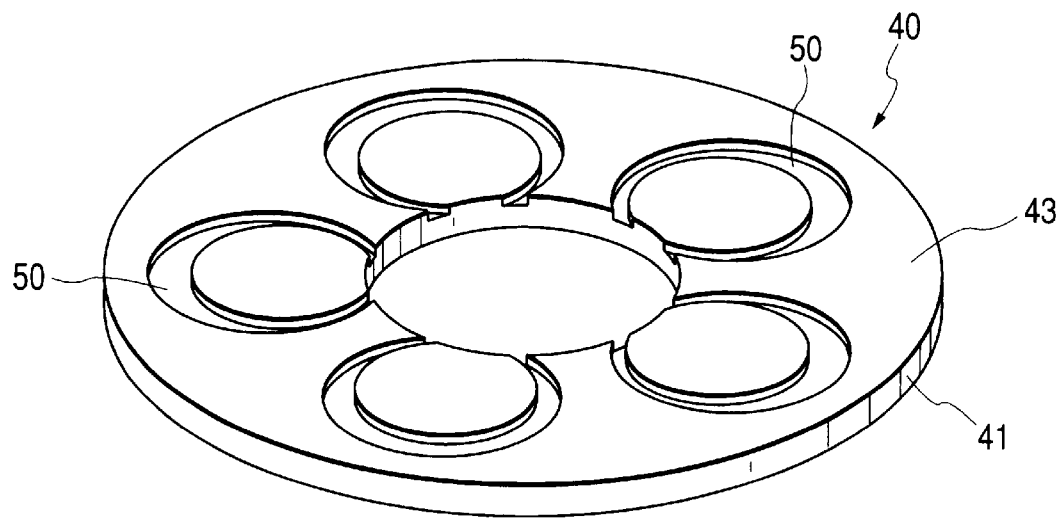
FIG. 15 is a view of a third modification of the structure of an uneven portion to be formed on the surface of a lining member; and, FIG. 16 is a view of a fourth modification of the structure of an uneven portion to be formed on the surface of a lining member.
Figure 16:
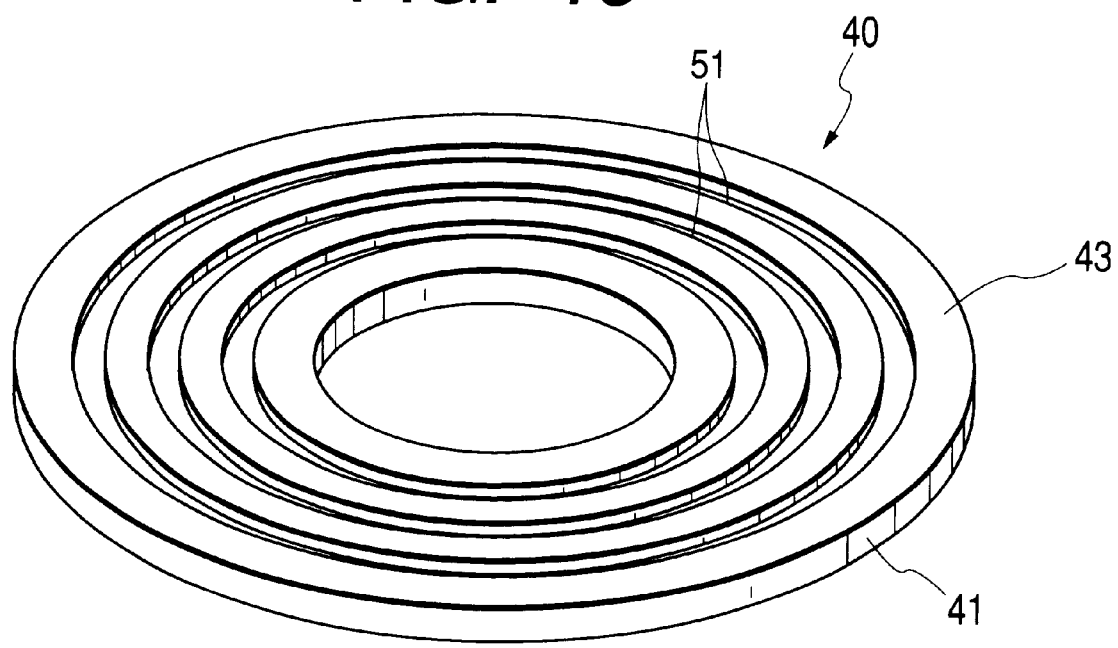

An uneven portion shown in FIG. 12 is an example in which a large number of cylindrical projecting portions 48 are provided on the surface of the lining member. Uneven portions shown in FIGS. 13 and 14 are respectively examples in which there are respectively formed recess-shaped grooves 49 and 49a curved in the diameter direction of the lining member. An uneven portion shown in FIG. 15 is an example in which there are formed ring-shaped grooves 50 along the peripheral direction of the lining member. An uneven portion shown in FIG. 16 is an example in which there are formed a plurality of concentrical-shaped grooves 51 extending along the outer periphery of the center hole of the lining member.

These various uneven portions can be formed in the following manner: that is, as an adhesive for fixing the fibers, there is used thermosetting resin, after the fibers 43 are transferred to the base member 41 in the above-mentioned manner, a plate with a desired uneven portion formed therein is contacted with the surface of the lining member, and the plate and lining member are then heated and pressurized to thereby harden the resin.

In the above-mentioned embodiment, description gives an example in which the invention is applied to a double-bearing type reel. However, this is not limitative but the invention can also apply to a drag mechanism which is incorporated into a spinning reel.

According to the invention, not only the elasticity and durability of a lining member to be disposed in a drag mechanism can be enhanced but also it is possible to provide a lining member which does not deteriorate in the drag performance thereof even when it is used for a long period of time. Also, according to a method of manufacturing a lining member in accordance with the invention, the above-structured lining member can be manufactured easily.

What is claimed is:

1. A lining member of a fishing reel including, a reel main body, a spool rotatably supported to the reel main body, a handle rotatably supported to the reel main body for winding a fishing line onto the spool, and a drag mechanism incorporated in the reel main body, the drag mechanism comprising:

the lining member for applying a brake force to a rotational movement of the spool in a fish line play-out direction, the lining member including,
a base member,
an adhesive layer applied to a surface of the base member, and
fibers, wherein one end of each fiber is adhered to the adhesive layer, the other end of each fiber is free of the adhesive layer.

2. The lining member according to claim 1, wherein a portion of a surface of the lining member is uneven.

3. The lining member according to claim 1, wherein each fiber is heat-resistant, and each fiber has a length between 0.5 and 5 mm.

4. The lining member according to claim 1, wherein grease is spread uniformly over a surface of the lining member.

5. The lining member according to claim 1, wherein lubricating particles each having a diameter of 0.001–1 mm is mixed among the fibers.

6. The lining member according to claim 1, wherein the drag mechanism includes a pressure member generating the brake force in cooperation with the lining member.

7. The lining member according to claim 1, wherein fibers extend in a direction substantially perpendicular to the surface of the base member.

8. A lining member of a fishing reel including, a reel main body, a spool rotatably supported to the reel main body, a handle rotatably supported to the reel main body for winding a fishing line onto the spool, and a drag mechanism incorporated in the reel main body, the drag mechanism comprising:

the lining member for applying a brake force to a rotational movement of the spool in a fish line play-out direction, the lining member including,
a base member, and
fibers provided on a surface of the base member, wherein a length of each of the fibers is between 0.5 and 5 mm.

9. The lining member according to claim 8, wherein the fibers are oriented in a direction substantially perpendicular to the surface of the base portion.

* * * * *